United States Patent
Wu et al.

(10) Patent No.: US 8,953,338 B2
(45) Date of Patent: Feb. 10, 2015

(54) CURVED DISPLAY MODULE AND DISPLAY DEVICE

(75) Inventors: Chi-Ming Wu, Tainan (TW); Wan-Tien Chen, Hsinchu County (TW); Jen-Shiun Huang, Hsinchu (TW); Shin-Yi Hsieh, Nantou County (TW); Chih-Hua Cheng, Miaoli County (TW)

(73) Assignee: E Ink Holdings Inc., Hsinchu (TW)

( * ) Notice: Subject to any disclaimer, the term of this patent is extended or adjusted under 35 U.S.C. 154(b) by 302 days.

(21) Appl. No.: 13/048,890

(22) Filed: Mar. 16, 2011

(65) Prior Publication Data

US 2012/0081874 A1    Apr. 5, 2012

(30) Foreign Application Priority Data

Sep. 30, 2010  (TW) .............................. 99133312 A (51) Int. Cl.
*H05K 7/02* (2006.01)
*H05K 7/04* (2006.01)
*G02F 1/1333* (2006.01)

(52) U.S. Cl.
CPC .. *G02F 1/1333* (2013.01); *G02F 2001/133302* (2013.01); *G02F 2201/56* (2013.01)
USPC ........... 361/807; 174/255; 174/256; 174/257; 174/258; 174/259

(58) Field of Classification Search
USPC ....................................................... 361/807
See application file for complete search history.

(56) References Cited

U.S. PATENT DOCUMENTS

| | | | | |
|---|---|---|---|---|
| 5,128,662 A | * | 7/1992 | Failla | 345/1.3 |
| 5,273,475 A | * | 12/1993 | Oshikawa | 445/24 |
| 5,846,110 A | * | 12/1998 | Kanagu et al. | 445/25 |
| 6,538,380 B1 | * | 3/2003 | Kanagu et al. | 313/582 |
| 6,688,933 B1 | * | 2/2004 | Heimgartner | 445/25 |
| 7,335,573 B2 | * | 2/2008 | Takayama et al. | 438/455 |
| 7,767,048 B2 | * | 8/2010 | Kanbayashi | 156/196 |

(Continued)

FOREIGN PATENT DOCUMENTS

| | | |
|---|---|---|
| CN | 101344651 A | 1/2009 |
| JP | 08-094991 | 4/1996 |

(Continued)

OTHER PUBLICATIONS

English machine translation from Korean to English of Korean pre-patent publication 10-2009-0080041 of application No. 10-2009-7007717, which depends from international application PCT/JP2007/070153, published Jul. 23, 2009, translated Mar. 19, 2013.*

(Continued)

*Primary Examiner* — David M Sinclair
*Assistant Examiner* — Theron Milliser
(74) *Attorney, Agent, or Firm* — CKC & Partners Co., Ltd.

(57) ABSTRACT

The invention discloses a curved display module and a display device. The curved display module includes an enclosure, at least one opening, a flexible display panel and an Optical Clear Adhesive (OCA) layer. There is a first curved surface inside the enclosure. A cavity is formed within the enclosure. The at least one opening are disposed on at least one edge of the enclosure and connected to the cavity. The flexible display panel is disposed on the first curved surface in the cavity. The OCA layer is disposed within the cavity. The OCA layer directly covers the flexible display panel.

6 Claims, 5 Drawing Sheets

(56) References Cited

U.S. PATENT DOCUMENTS

| | | | |
|---|---|---|---|
| 7,777,409 B2 * | 8/2010 | Yamazaki et al. | 313/504 |
| 7,834,962 B2 * | 11/2010 | Satake et al. | 349/110 |
| 8,305,743 B2 * | 11/2012 | Wu et al. | 361/679.21 |
| 2004/0046909 A1 * | 3/2004 | Sekiguchi | 349/113 |
| 2006/0061946 A1 * | 3/2006 | Vick | 361/681 |
| 2008/0212271 A1 * | 9/2008 | Misawa | 361/681 |
| 2009/0015747 A1 * | 1/2009 | Nishizawa et al. | 349/58 |
| 2009/0059563 A1 * | 3/2009 | Takata et al. | 362/97.1 |
| 2009/0122223 A1 * | 5/2009 | Hayano et al. | 349/58 |
| 2009/0161048 A1 * | 6/2009 | Satake et al. | 349/110 |
| 2009/0284904 A1 * | 11/2009 | Wu et al. | 361/679.01 |
| 2010/0073620 A1 | 3/2010 | Yamaguchi et al. | |
| 2010/0142127 A1 * | 6/2010 | Johansson | 361/679.01 |
| 2010/0289983 A1 * | 11/2010 | Rocard et al. | 349/62 |
| 2010/0296027 A1 * | 11/2010 | Matsuhira et al. | 349/96 |
| 2011/0273826 A1 * | 11/2011 | Misawa | 361/679.01 |
| 2012/0020056 A1 * | 1/2012 | Yamagata et al. | 362/97.1 |

FOREIGN PATENT DOCUMENTS

| | | | |
|---|---|---|---|
| JP | 10186333 A | 7/1998 | |
| JP | 10268268 A | 10/1998 | |
| JP | 10268269 A | 10/1998 | |
| JP | 2002-341792 A | 11/2002 | |
| JP | 2006-058753 A | 3/2006 | |
| JP | 2006106603 A | 4/2006 | |
| JP | 2009-116204 A | 5/2009 | |
| KR | 10-2009-0080041 | * 7/2009 | G02F 1/1333 |
| TW | M256982 | 2/2005 | |
| TW | M347682 | 12/2008 | |
| TW | 201009774 A | 3/2010 | |
| WO | 2009054168 | 4/2009 | |

OTHER PUBLICATIONS

Office action of corresponding Chinese application.

Corresponding JP 1st Office Action that these art references were cited.

Corresponding JP 2nd Office Action that these art references were cited.

TW Office Action that these art references were cited.

* cited by examiner

CURVED DISPLAY MODULE AND DISPLAY DEVICE

RELATED APPLICATIONS

This application claims priority to Taiwan Application Serial Number 099133312, filed Sep. 30, 2010, which is herein incorporated by reference.

BACKGROUND

1. Field of Invention

The present invention relates to a display module. More particularly, the present invention relates to a display module with curved display area.

2. Description of Related Art

Electronic display devices are widely utilized on all kinds of applications, such as LCD TVs, LCD monitors, digital commercial panels, laptop computers, PDA, mobile phones, digital cameras and e-book readers. Most of traditional display devices have flat display panel, e.g. flat panel TV or flat LCD monitor.

Most of time, traditional flat display devices utilize a hard flat glass plate for supporting. However, the hard flat glass plate is heavy and fragile. Therefore, it is not suitable for portable usage and incapable to resist an impact.

Recently, flexible display panels are developed for replacing papers and traditional panels. The flexible display panels disposed on flexible substrates, which are capable of bending to a certain degree, are utilized in curved display devices. E-paper display device is an example of well-known and widespread flexible display device with slim shape and low power consumption.

Besides, stability, durability, impact-resistance are also important quality factors of a display device. However, in order to realize a flexible display area, most display devices with flexible display panel utilize soft (flexible) substrate and covering. On a flexible display device without protection of the hard glass plate, strength and surface hardness is insufficient to resist an outer impact. When there is an outer force applied on the display device, the display panel of the device will probably be affected, such that the flexible display panel may be out of function temporally or damaged permanently.

SUMMARY

In order to solve the aforesaid problem, the goal of the invention is to provide a curved display module and a display device. During the packaging process, an optical clear adhesive (OCA) layer is disposed between the flexible display panel and the enclosure. The OCA layer covering on the flexible display panel can be used for holding the flexible display panel. In the mean time, the OCA layer can be used to buffer an outer force (e.g. impact force) and protect the flexible display panel.

Therefore, an aspect of the invention is to provide a curved display module, which includes an enclosure, at least one opening, a flexible display panel and an OCA layer. A first curved surface and a cavity are formed within the enclosure. The at least one opening is disposed on at least one edge of the enclosure and connected to the cavity. The flexible display panel is disposed on the first curved surface in the cavity. The OCA layer is disposed within the cavity. The optical clear adhesive layer directly covers the flexible display panel.

According to an embodiment of the invention, a second curved surface is formed inside the enclosure. The second curved surface is opposite to the first curved surface. The cavity is formed between the first curved surface and the second curved surface. The optical clear adhesive layer is disposed between the flexible display panel and the second curved surface.

According to another embodiment of the invention, the enclosure includes a back plate and a cover plate. The first curved surface is located on the back plate. At least a part of the cover plate is transparent.

According to another embodiment of the invention, the OCA layer is formed by injecting a liquid optical clear adhesive through the at least one opening into the cavity.

According to another embodiment of the invention, the OCA layer is formed by pasting an optical clear adhesive film onto the flexible display panel.

According to another embodiment of the invention, the optical clear adhesive layer is made by at least one material selected from the group consisting of silicone, acrylic plastic, resin and epoxy resin.

Another aspect of the invention is to provide a display device, which includes a main case, an electronic system and a curved display module. The main case has a first cured surface. The electronic system is disposed within the main case. The curved display module is disposed on the main case. The curved display module includes an enclosure, at least one opening, a flexible display panel and an OCA layer. The enclosure is disposed on the first curved surface. A cavity is formed between the enclosure and the main case. The at least one opening is disposed on at least one edge of the enclosure and connected to the cavity. The flexible display panel is disposed in the cavity and located on the first curved surface of the main case. The optical clear adhesive layer is disposed within the cavity. The optical clear adhesive layer directly covers the flexible display panel.

According to an embodiment of the invention, a second curved surface is formed inside the enclosure. The second curved surface of the enclosure is opposite to the first curved surface of the main case. The cavity is formed between the first curved surface and the second curved surface. The OCA is disposed between the flexible display panel and the second curved surface.

According to another embodiment of the invention, at least a part of the cover plate is transparent.

According to another embodiment of the invention, the OCA layer is formed by injecting a liquid optical clear adhesive through the at least one opening into the cavity.

According to another embodiment of the invention, the OCA layer is formed by pasting an optical clear adhesive film onto the flexible display panel.

According to another embodiment of the invention, the OCA is made by at least one material selected from the group consisting of silicone, acrylic plastic, resin and epoxy resin

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
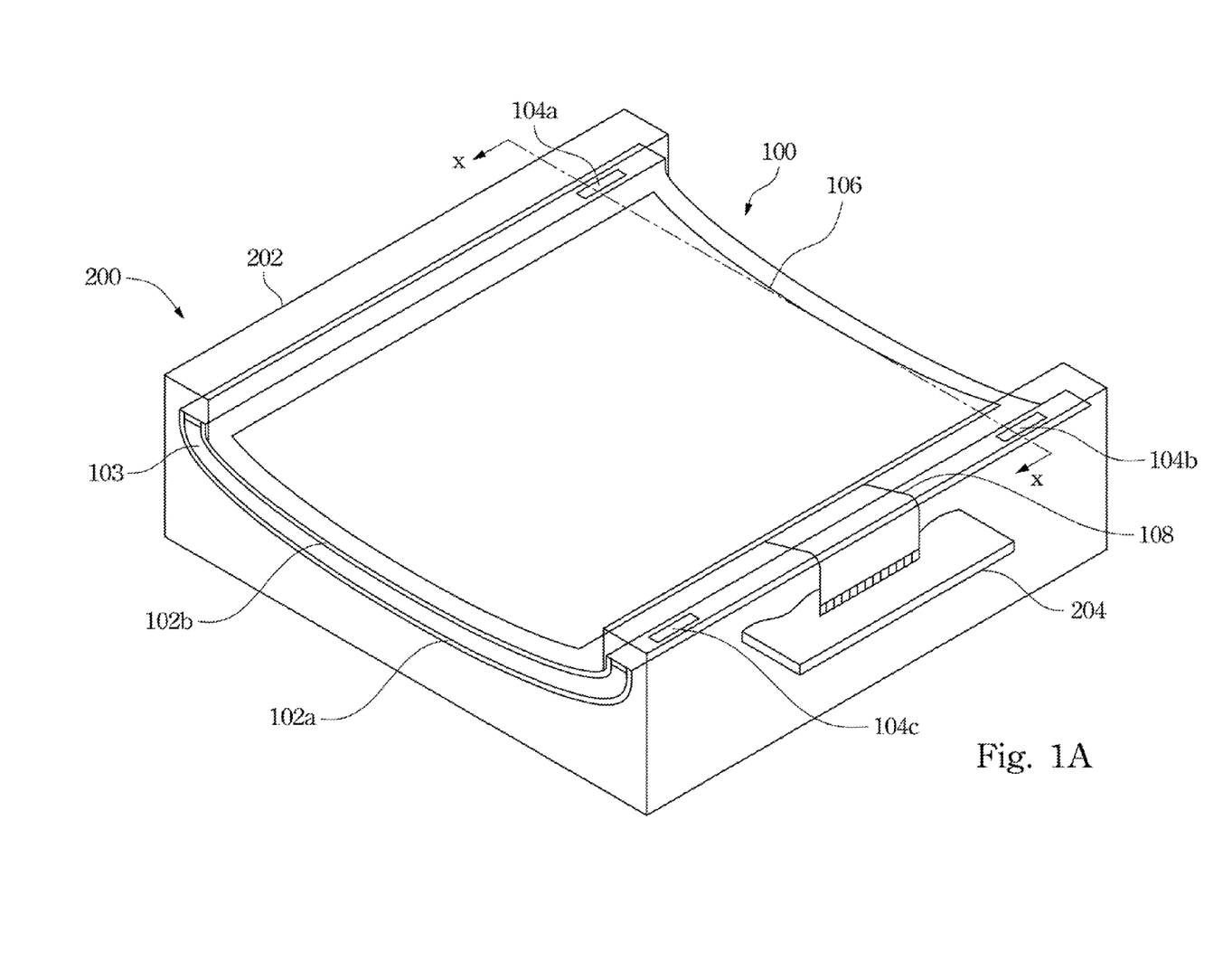
FIG. 1A is an outside view diagram illustrating a curved display module according to an embodiment of the invention.
Figure 1B:
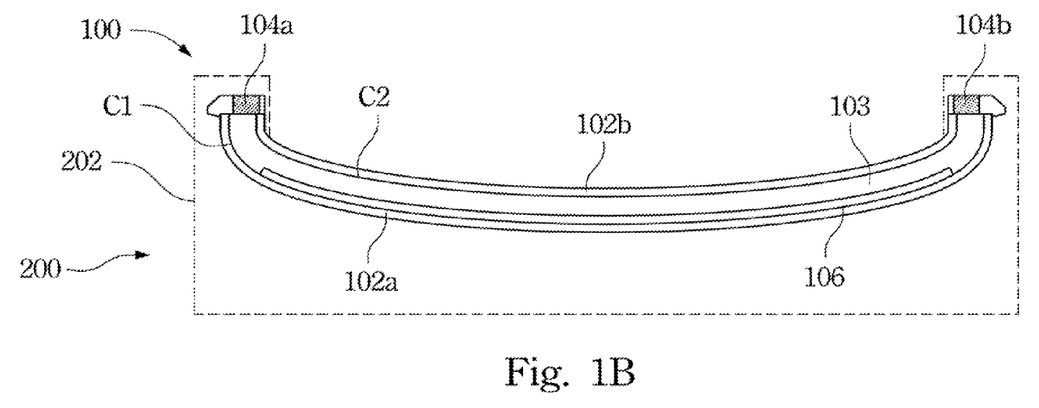
FIG. 1B is a sectional view diagram illustrating the curved display module without an OCA layer.
Figure 1C:
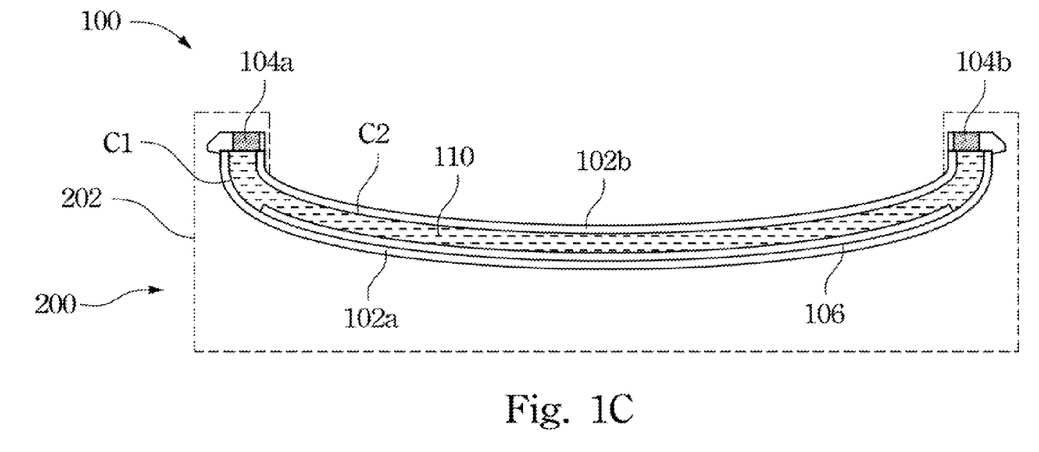
FIG. 1C is a sectional view diagram illustrating the curved display module.

Please refer to FIG. 1A, FIG. 1B and FIG. 1C. FIG. 1A is an outside view diagram illustrating a curved display module 100 according to an embodiment of the invention. FIG. 1B is a sectional view diagram illustrating the curved display module 100 without an OCA layer along sectional line X-X. FIG. 1C is a sectional view diagram illustrating the curved display module 100 along sectional line X-X. As shown in FIG. 1A, the curved display module 100 in this embodiment includes an enclosure (combining 102a and 102b), three openings (104a~104c), a flexible display panel 106 and a connection cable 108.

As shown in FIG. 1B, the enclosure of the curved display module 100 includes a back plate 102a and a cover plate 102b. A cavity 103 is formed between the back plate 102a and the cover plate 102b, i.e. the internal surfaces of the enclosure. However, the invention is not limited to this embodiment. In another embodiment, the enclosure can be formed in one piece instead of two components. The cavity can be formed inside the one-piece enclosure as well.

As shown in FIG. 1B, there are two curved surface inside the enclosure (respectively on the back plate 102a and the cover plate 102b) in this embodiment. The curved surface C1 is on the back plate 102a. The curved surface C2 is on the cover plate 102b. The curved surface C1 is opposite to the curved surface C2. The flexible display panel is disposed within the cavity 103 and on the curved surface C1 of the back plate 102a. Generally, the curved display module 100 can be integrated with a display device 200. The back plate 102a can be adjacent to a main case 202 of the display device 200. The cover plate 102b can be exposed on external surface. Partial or whole cover plate 102b can be made by transparent material, such that user may see the flexible display panel 106 on the back plate 102a through the transparent part of the cover plate 102b.

The display device 200 further includes an electronic system 204 (e.g. display driver circuit, power supply, process unit, etc) disposed in the main case 202. The curved display module 100 can be electrically connected to the electronic system 204 through the connection cable 108.

In this embodiment, two ends of the back plate 102a bend toward the cover plate 102b. In this embodiment, the curved surface C1 is a concave surface relative to the flexible display panel 106; the curved surface C2 is a convex surface relative to the flexible display panel 106; and the back plate 102a and the cover plate 102b have similar curvature, but the invention is not limited to this.

As shown in FIG. 1A and FIG. 1B, the openings 104a~104c are disposed on edges of the enclosure (the back plate 102a and the cover plate 102b) and connected to the cavity 103 inside the enclosure.

In practical applications, the cover plate is usually exposed on the external surface. Therefore, when there is an outer force (e.g. impact, crash, accidentally fall, etc) applied on the cover plate, the cover plate may be pressed toward the flexible display panel. The flexible display panel in prior art may be mal-functioned or damaged because the outer force.

To be noticed that, as shown in FIG. 1C, the curved display module 100 of the invention has an optical clear adhesive (OCA) layer 110 disposed in the cavity between the back plate 102a and the cover plate 102b. The OCA layer 110 directly covers the flexible display panel 106.

The OCA layer 110 is made by at least one material selected from the group consisting of silicone, acrylic plastic, resin and epoxy resin. OCA is one kind of adhesive material utilized in LCD, touch device and monitor applications. OCA is mainly used for adhering a display panel or a touch component onto a heterogeneous substrate or a homogeneous substrate.

In this embodiment, the OCA layer 110 can be formed by injecting a liquid optical clear adhesive. The liquid OCA can be stored in liquid state, and the liquid optical clear adhesive will be solidified under heat or ultraviolet projection. It has high transparency, good adherence, resilience and flexibility.

In this embodiment, the liquid OCA is injected into the cavity 103 through the opening 104a~104c, and then the liquid OCA may fill in the cavity 103 and form the OCA layer 110. The OCA layer 110 is filled between the flexible display panel 106 and the curved surface C2 of the cover plate 102b. Therefore, when an outer force (e.g. impact, crash, accidentally fall, etc) is applied on the cover plate 102b, the OCA layer 110 may buffer the outer force and protect the flexible display panel 106 from being damaged by the outer force.

In aforesaid embodiment, the OCA layer 110 is formed by injecting the liquid OCA into the cavity 103. However, the invention is not limited to this. In another embodiment, the OCA layer 110 is not limited to be made by a liquid OCA. The OCA layer 110 can be an optical clear adhesive film. The OCA film is pasted onto the flexible display panel 106, for forming the OCA layer 110 adhered on the flexible display panel 106. Finally, the enclosure (the back plate 102a and the cover plate 102b) are assembled to surround the flexible display panel 106 and the OCA layer 110 formed by the OCA film. In this process procedure, there are the flexible display panel 106 and the film-shaped OCA layer 110 disposed within the cavity 103 of the enclosure.

In other words, the OCA layer 110 inside the cavity 103 can be liquid type, glue type, flexible or solid film type. The invention is not limited to one specific type of the OCA layer.

Figure 2A:
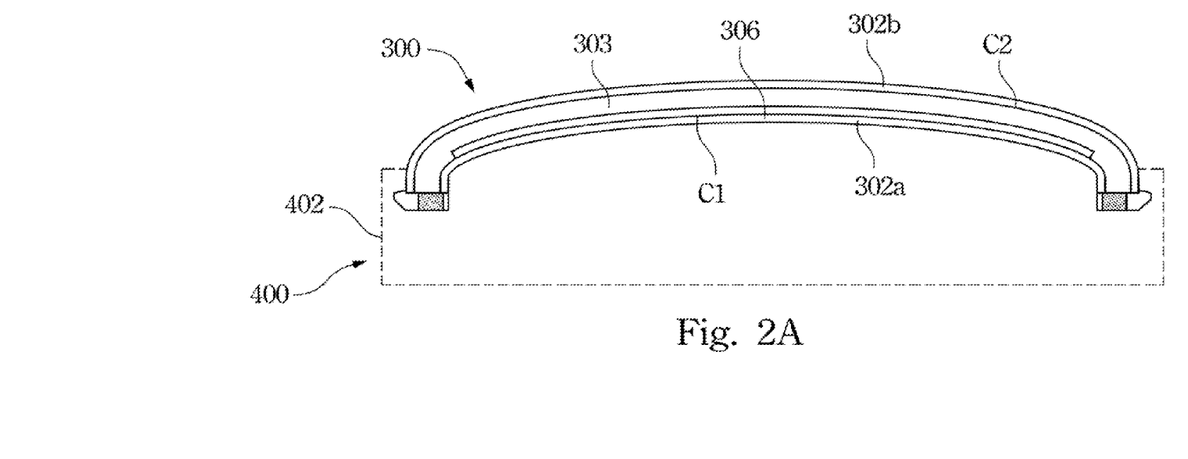
FIG. 2A is a sectional view diagram illustrating a curved display module without an OCA layer according to another embodiment of the invention.
Figure 2B:
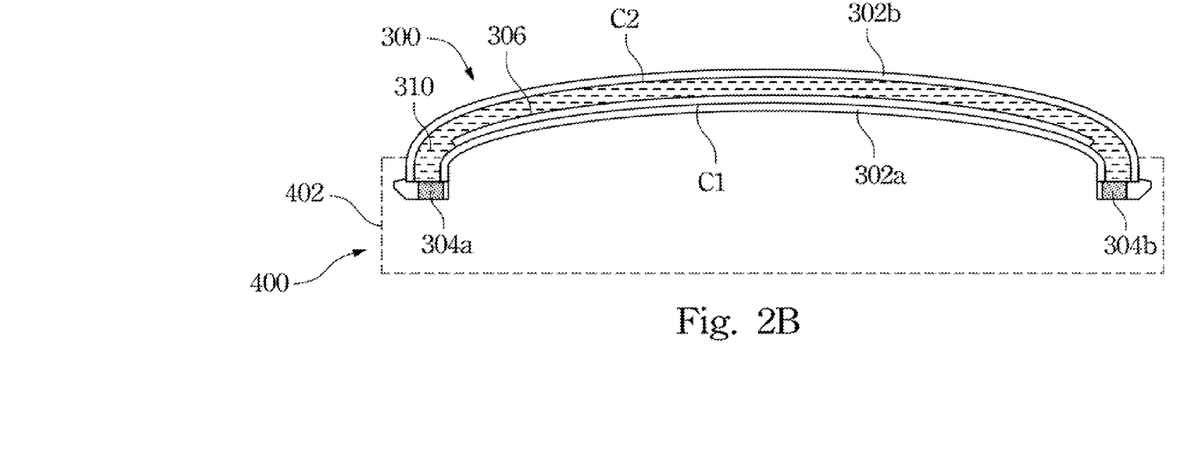
FIG. 2B is a sectional view diagram illustrating the curved display module.

Besides, the outer surface of the enclosure (i.e. the cover plate 102b) is inwardly concave, so as to form a concave-surfaced display module. However, the invention is not limited to this. In another embodiment, the outer surface of the enclosure can be outwardly convex. Please refer to FIG. 2A and FIG. 2B. FIG. 2A is a sectional view diagram illustrating a curved display module 300 without an OCA layer according to another embodiment of the invention. FIG. 2B is a sectional view diagram illustrating the curved display module 300. An enclosure of the curved display module 300 includes a back plate 302a and a cover plate 302b. There are two curved surface inside the enclosure (the back plate 302a and the cover plate 302b). The curved surface C1 is on the back plate 302a. The curved surface C2 is on the cover plate 302b. The curved surface C1 is opposite to the curved surface C2.

In this embodiment, two ends of the cover plate 302b bend toward the back plate 302a. In this embodiment, the curved surface C1 is a convex surface relative to the flexible display panel 306; the curved surface C2 is a concave surface relative to the flexible display panel 306; and the enclosure is a convex design overall. Beside, an OCA layer 310 is filled into a cavity 303 through opening 304a~304c, and is disposed between a flexible display panel 306 and the curved surface C2 of the cover plate 302b, for buffering an outer force. The detail structure of the curved display module 300 is similar or corresponding to the curved display module 100 (from FIG. 1A to FIG. 1C) in aforesaid embodiment. Please refer to aforesaid embodiment.

In other words, the invention discloses a curved display module and an optical clear adhesive buffer layer, which can be applied in any concave or convex display device. In practical applications, the invention can further be applied on any curved display device with similar curved surface structure (two-segment arc, multi-segment arc, circle, irregular curvature, etc).

In aforesaid embodiment, the enclosure (back plate and cover plate assembly type, one-piece enclosure type) forms the cavity for accommodating the flexible display panel and the OCA layer by itself. However, the invention is not limited to this. In another embodiment, the curved display module does not form the cavity by itself. In this case, the curved display module may cooperate with the display device for forming the cavity together, such that production cost and size of the display device can be reduced.

Figure 3A:
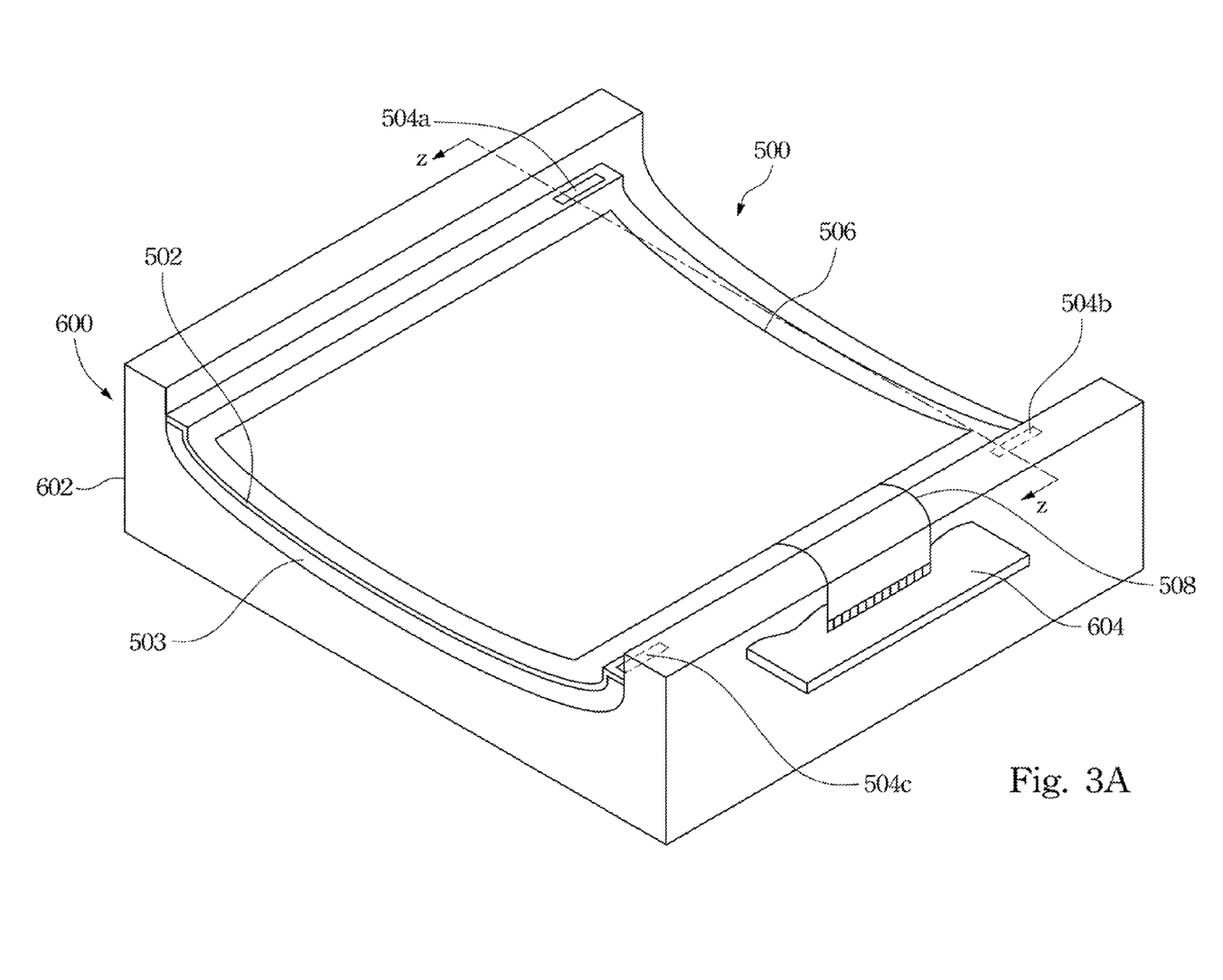
FIG. 3A is an outside view diagram illustrating a display device and a curved display module thereof according to an embodiment of the invention.
Figure 3B:
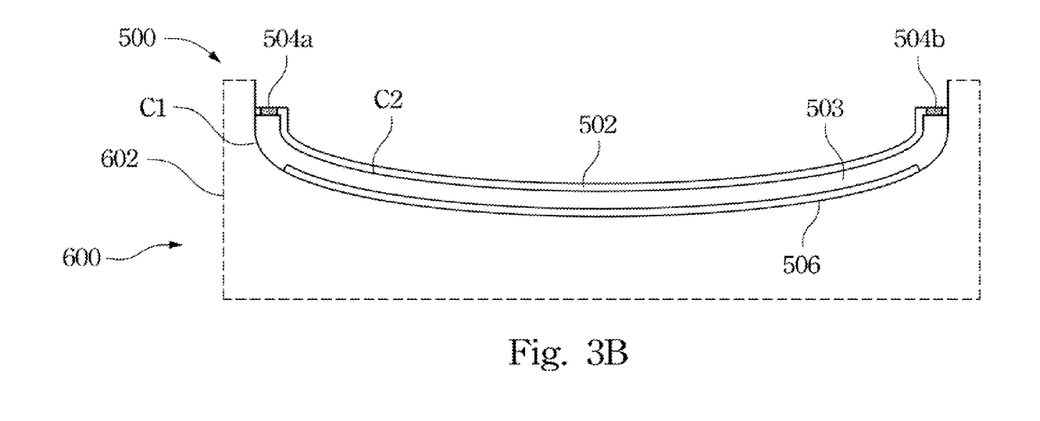
FIG. 3B is a sectional view diagram illustrating the curved display module without an OCA layer.
Figure 3C:
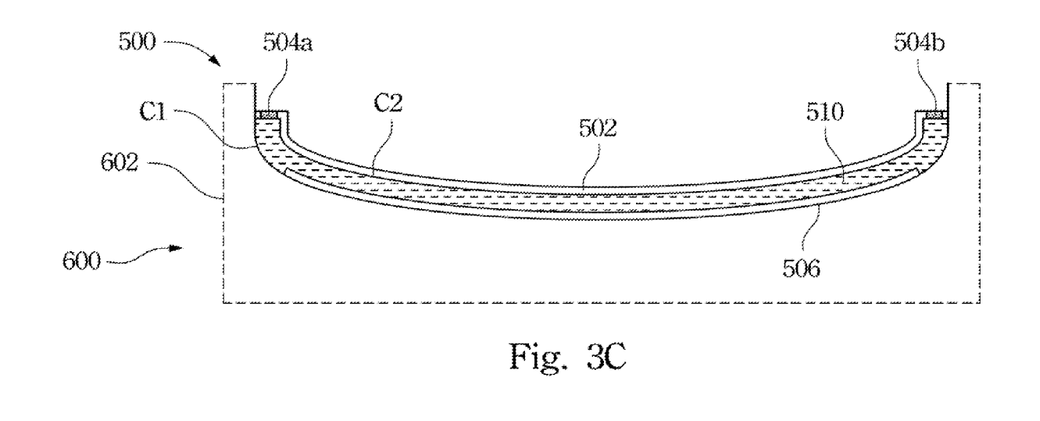
FIG. 3C is a sectional view diagram illustrating the curved display module of the display device.

Please refer to FIG. 3A, FIG. 3B and FIG. 3C. FIG. 3A is an outside view diagram illustrating a display device 600 and a curved display module 500 thereof according to an embodiment of the invention. FIG. 3B is a sectional view diagram illustrating the curved display module 500 without an OCA layer along sectional line Z-Z. FIG. 3C is a sectional view diagram illustrating the curved display module 500 of the display device 600 along sectional line Z-Z. As shown in FIG. 3A, the curved display module 500 in this embodiment includes an enclosure 502, three openings 504a~504c, a flexible display panel 506 and a connection cable 508.

To be notice that, the enclosure 502 of the curved display module 500 is not a hollow structure in this embodiment. The enclosure 502 does not form a cavity alone. In the embodiment, the enclosure 502 is disposed on a main case 602 of the display device 600. The enclosure 502 cooperates with the main case 602 to form a cavity. In this embodiment, the enclosure 502 is disposed on a curved surface C1 of the main case 602. A cavity (see the cavity 503 in FIG. 3B) is formed between the enclosure 502 and the main case 602.

The display device 600 further includes an electronic system 604 (e.g. display driver circuit, power supply, process unit, etc) disposed in the main case 602. The curved display module 500 can be electrically connected to the electronic system 604 through the connection cable 508.

Please refer to FIG. 3A and FIG. 3B at the same time. The openings 504a~504c are disposed on edges of the enclosure 502 and connected to the cavity 503. The flexible display panel 506 is disposed in the cavity 503 and located on the curved surface C1 of the main case 602.

Then, please refer to FIG. 3C at the same time. The OCA layer 510 is disposed in the cavity 503 through the openings 504a~504c. The OCA layer 510 may directly cover the flexible display panel 506.

Besides, a curved surface C2 is on the enclosure 502. The curved surface C2 of the enclosure 502 is opposite to the curved surface C1 of the main case 602. The cavity 503 is formed between the curved surface C1 and the curved surface C2. The OCA layer 510 is disposed between the flexible display panel 506 and the curved surface C2. When an outer force is applied on the enclosure 502, the OCA layer 510 may serve as a buffer layer.

In practical applications, at least a part of the enclosure 502 can be made by transparent material, such that user may see the flexible display panel 506. The OCA layer 510 is made by at least one material selected from the group consisting of silicone, acrylic plastic, resin and epoxy resin.

Besides, the OCA layer 510 inside the cavity 503 can be liquid type, glue type, flexible or solid film type. The invention is not limited to one specific type of the OCA layer. The OCA layer 510 can be formed by injecting a liquid optical clear adhesive through the at least one opening into the cavity. Or in another case, the OCA layer 510 can be formed by pasting an optical clear adhesive film onto the flexible display panel 506, and then complete the assembly of the enclosure 502.

Therefore, the curved display module is not limited to form the cavity alone. Instead, the curved display module, may cooperate with the main case of the display device for forming the cavity together. In this way, the production cost of the display device can be reduced, and design of the display device can be compact and slim.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
a main case having a first curved surface, the first curved surface having a covered region and two opposite exposed regions connected to opposite sides of the covered region;
an electronic system disposed within the main case; and
a curved display module disposed on the main case, the curved display module comprising:
an enclosure disposed on the first curved surface, wherein the covered region is covered by the enclosure, and the exposed regions are not covered by the enclosure, wherein the enclosure comprises an outer curved surface and two opposite outer flat surfaces connected to opposite sides of the outer curved surface, wherein a cavity is formed between the enclosure and the covered region of the first curved surface of the main case;
a flexible display panel disposed in the cavity, and a portion of the flexible display panel being in contact with the covered region of the first curved surface of the main case;
an optical clear adhesive layer disposed within the cavity, the optical clear adhesive layer directly covering another portion of the flexible display panel that is not in contact with the covered region; and
three openings, each having a closed-boundary, configured to inject the optical clear adhesive layer into the cavity, wherein two of the three openings are formed on one of the two outer flat surfaces, and the other one of the three openings is formed on another one of the two outer flat surfaces, wherein the exposed regions of the first curved surface of the main case extends from outer edges of the outer flat surfaces upwardly, and the outer curved surface extends from inner edges of the outer flat surfaces downwardly;
wherein a cross section of the covered region of the main case is arc-shaped and has a height, and the two exposed regions of the main case extend from the opposite sides of the covered region and are substantially parallel to the height of the covered region;
wherein the main case further has two top flat surfaces connected respectively to upper ends of the exposed regions of the main case, and the two top flat surfaces are substantially perpendicular to the height of the covered region;

wherein a cross section of the outer curved surface of the enclosure is arc-shaped and has a height, the two opposite outer flat surfaces of the enclosure extend respectively from the opposite sides of the outer curved surface and are substantially perpendicular to the height of the outer curved surface, and areas of the outer curved surface adjacent to the connection with the two opposite outer flat surfaces are formed as vertical sections that are substantially parallel to the height of the outer curved surface;

wherein the heights of the covered region of the main case and the outer curved surface of the enclosure are taken along lines that are roughly coincident with a line that interconnects a center point of the covered region of the main case with a center point of the outer curved surface of the enclosure;

wherein when the display device is placed on a flat supporting surface with the flexible display panel facing upwardly, the covered region of the main case and the outer curved surface of the enclosure arc upwardly and their heights are substantially perpendicular to the supporting surface, a stepped configuration is formed on each side of the display device when the display device is viewed in cross section, and the stepped configuration on each side of the display device includes a pair of downwardly descending steps formed by one of the top flat surfaces of the main case, the corresponding exposed region of the main case, the corresponding outer flat surface of the enclosure, and the corresponding vertical section of the outer curved surface of the enclosure in this sequence.

2. The display device of claim 1, wherein a second curved surface is formed inside the enclosure, the second curved surface of the enclosure is opposite to the first curved surface of the main case, the cavity is formed between the first curved surface and the second curved surface, and the optical clear adhesive layer is disposed between the flexible display panel and the second curved surface.

3. The display device of claim 1, wherein at least a part of the enclosure is transparent.

4. The display device of claim 1, wherein the optical clear adhesive layer is formed by injecting a liquid optical clear adhesive through the at least one opening into the cavity.

5. The display device of claim 1, wherein the optical clear adhesive layer is transformed from a liquid optical clear adhesive injected into the cavity through any one of the three openings.

6. The display device of claim 1, wherein the optical clear adhesive layer is made by at least one material selected from the group consisting of silicone, acrylic plastic, resin and epoxy resin.

* * * * *